US 7,284,276 B2

(12) United States Patent
Conover et al.

(10) Patent No.: US 7,284,276 B2
(45) Date of Patent: Oct. 16, 2007

(54) RETURN-TO-LIBC ATTACK DETECTION USING BRANCH TRACE RECORDS SYSTEM AND METHOD

(75) Inventors: Matthew Conover, Mountain View, CA (US); Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 720 days.

(21) Appl. No.: 10/763,867

(22) Filed: Jan. 22, 2004

(65) Prior Publication Data

US 2005/0166001 A1 Jul. 28, 2005

(51) Int. Cl.
*H04L 9/00* (2006.01)
(52) U.S. Cl. .......................... 726/26; 726/22; 726/23; 726/24; 713/165; 713/167; 713/188
(58) Field of Classification Search ................ None
See application file for complete search history.

(56) References Cited

U.S. PATENT DOCUMENTS

| | | | | |
|---|---|---|---|---|
| 5,822,517 | A | 10/1998 | Dotan | 395/186 |
| 6,301,699 | B1 | 10/2001 | Hollander et al. | 717/4 |
| 6,412,071 | B1 * | 6/2002 | Hollander et al. | 726/23 |

OTHER PUBLICATIONS

Baratloo, A., et al, 'Transparent Run-Time Defense Against Stack Smashing Attacks', 2000 Proceedings of the USENIX Annual Technical Conference, entire document, http://citeseer.ist.psu.edu/cache/papers/cs/24655/http:zSzzSzwww.research.avayalabs.comzSzprojectzSzlibsafezSzdoczSzusenix00.pdf/baratloo00transparent.pdf.*
Choi, Y., et al, 'A New Stack Buffer Overflow Hacking Defense Technique with Memory Address Confirmation', ICISC 2001: 4th International Conference Seoul, Korea, Dec. 6-7, 2001. Proceedings, pp. 146-159, http://www.springerlink.com/content/x8tn836pk6wyp8kw/fulltext.pdf.*
Larochelle, D., et al, 'Statically Detecting Likely Buffer Overflow Vulnerabilities', Hackers Digest, Iss. 2, Fall 2001, pp. 45-58, http://www.cs.virginia.edu/~evans/pubs/hd_fall_2001.pdf.*
Pedram,'Branch Tracing with Intel MSR Registers', www.openrce.org/blog, Dec. 13, 2006, entire blog, https://www.openrce.org/blog/view/535/Branch_Tracing_with_Intel_MSR_Registers.*
Chien, E. and Szor, P., *"Blended Attacks Exploits, Vulnerabilities and Buffer-Overflow Techniques In Computer Viruses"*, Virus Bulletin Conference, Sep. 2002, Virus Bulletin Ltd., The Pentagon, Abingdon, Oxfordshire, England, pp. 1-36.
Dabak, P., Borate, M. and Phadke, S., *"Hooking Windows NT System Services"*, pp. 1-8 [online]. Retrieved on Apr. 16, 2003. Retrieved from the Internet: URL:http://www.windowsitlibrary.com/Content/356/06/2.html.

(Continued)

*Primary Examiner*—Nasser Moazzami
*Assistant Examiner*—Ronald Baum
(74) *Attorney, Agent, or Firm*—Gunnison, McKay & Hodgson, L.L.P.; Serge J. Hodgson

(57) ABSTRACT

A method includes stalling a call to a critical operating system (OS) function and determining whether branch trace records of the call include a return instruction. Upon a determination that the branch trace records of the call do include a return instruction, the method further includes taking protective action to protect a computer system.

23 Claims, 6 Drawing Sheets

OTHER PUBLICATIONS

"*How Entercept Protects: System Call Interception*", pp. 1-2 [online]. Retrieved on Apr. 16, 2003. Retrieved from the Internet: <URL:http://www.entercept.com/products/technology/kernelmode.asp>. No author provided.

"*How Entercept Protects: System Call Interception*", p. 1 [online] . Retrieved on Apr. 16, 2003. Retrieved from the Internet: <URL:http://www.entercept.com/products/technology/interception.asp>. No author provided.

Gordon, J., "*Understand . . . the Stack (part 1)*", pp. 1-8 [online]. Retrieved on Aug. 27, 2003. Retrieved from the Internet: <URL:http://www.jorgon.freeserve.co.uk/GoasmHelp/usstack1.htm>.

Chew, M. and Song, D., "*Mitigating Buffer Overflows by Operating System Randomization*", Dec. 2002, 9 pages.

"*Entercept Continues to Dominate the Market in Buffer Overflow Protection*", p. 1-2 [online]. Retrieved on Aug. 6, 2003. Retrieved from the Internet: <URL:http://www.entercept.com/news/uspr/07-09-02.asp>. No author provided.

"*IA-32 Intel® Architecture Software Developer's Manual*; vol. 3: *System Programming Guide*", pp. 15-11 to 15-22. 2002. No author provided.

Dabak, P. , Borate, M. , Phadke, S. , *Adding New System Services to the Windows NT Kernal*, pp. 1-5 [online]. Retrieved Dec. 16, 2003. Retrieved from the Internet: URL:http://www.windowsitlibrary.com/Content/356/07/1.html.

Szor, U.S. Appl. No. 10/671,202, filed Sep. 25, 2003, entitled "Return-to-LIBC Attack Blocking System and Method".

Szor, U.S. Appl. No. 10/360,341, filed Feb. 6, 2003, entitled "Shell Code Blocking System and Method".

Sobel et al., U.S. Appl. No. 10/140,149, filed May 6, 2002, entitled "Alteration of Module Load Locations".

* cited by examiner

RETURN-TO-LIBC ATTACK DETECTION USING BRANCH TRACE RECORDS SYSTEM AND METHOD

BACKGROUND OF THE INVENTION

1. Field of the Invention

The present invention relates to the protection of computer systems. More particularly, the present invention relates to a system and method of detecting and blocking Return-to-LIBC attacks.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

One category of buffer overflow, sometimes called stack-based buffer overflow, involves overwriting stack memory, sometimes called the stack. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions.

In the case of a Return-to-LIBC attack, the attacker overflows the stack in such a way that a return address will be replaced to point to a library function in a loaded library inside the process address space. Thus, when the return address is used by the overflowed process, a library function will be executed. This way the attacker runs at least one application programming interface (API) to run a command shell on the compromised system remotely.

SUMMARY OF THE INVENTION

A method includes stalling a call to a critical operating system (OS) function and determining whether branch trace records of the call include a return instruction. Upon a determination that the branch trace records of the call do include a return instruction, the method further includes taking protective action to protect a computer system.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 2:
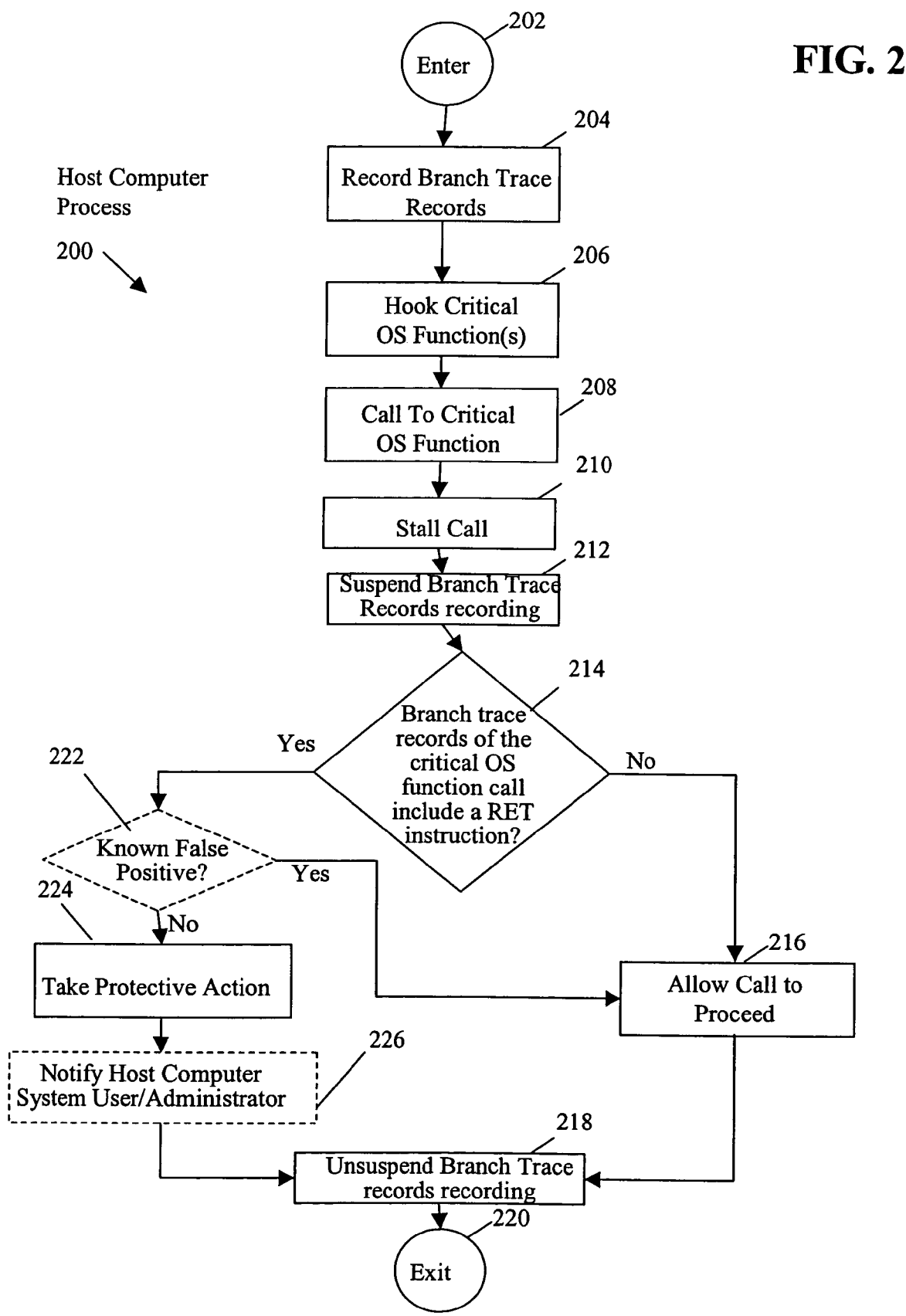
FIG. 2 is a flow diagram of a host computer process in accordance with one embodiment of the present invention.

In accordance with one embodiment, referring to FIG. 2, a method includes stalling a call to a critical operating system (OS) function (OPERATION 210) and determining whether branch trace records of the call include a return instruction (CHECK OPERATION 214). Upon a determination that the branch trace records of the call do include a return instruction, the method further includes taking protective action to protect a computer system (OPERATION 224).

Figure 1:
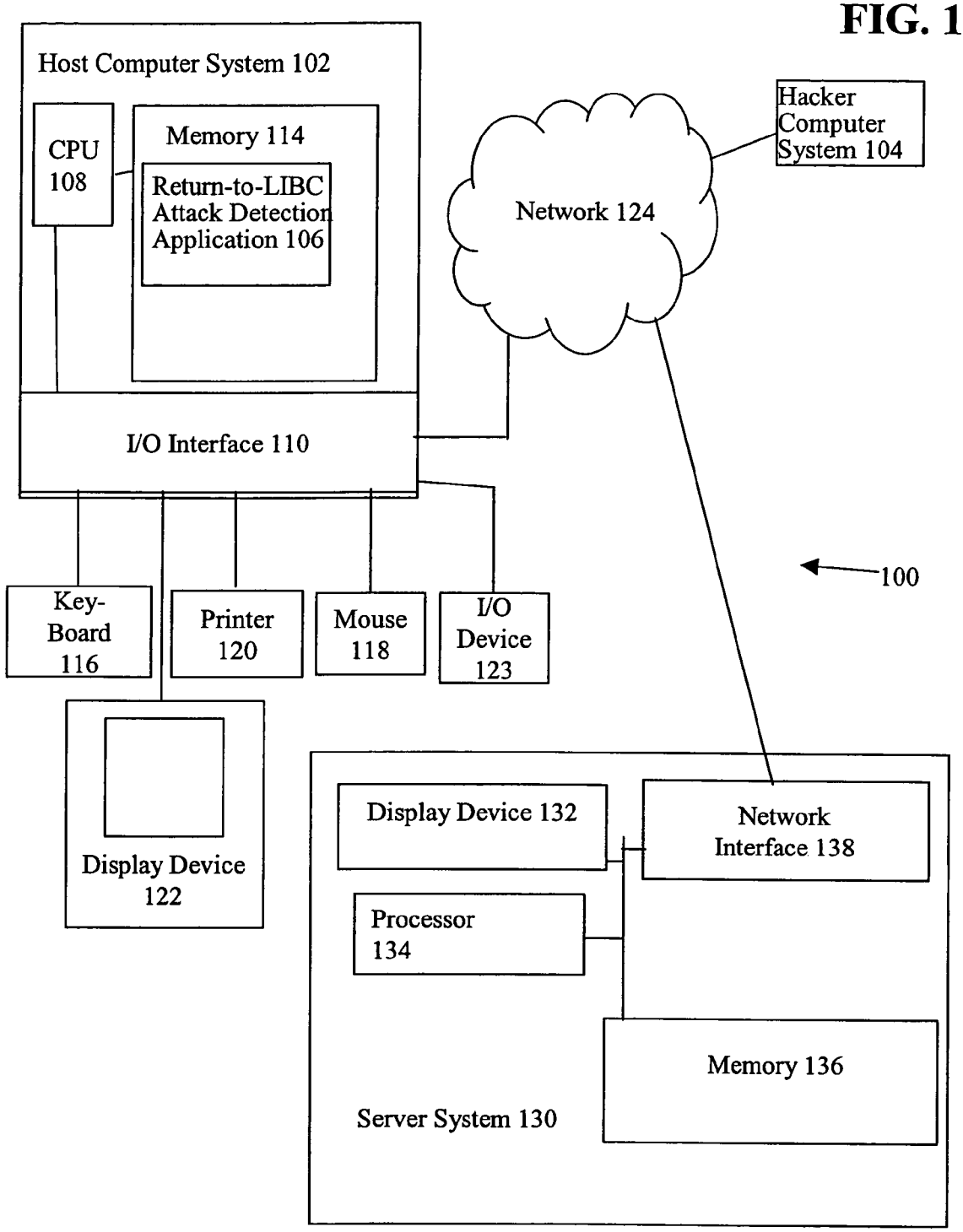
FIG. 1 is a diagram of a client-server system that includes a Return-to-LIBC attack detection application executing on a host computer system in accordance with one embodiment of the present invention.

More particularly, FIG. 1 is a diagram of a client-server system 100 that includes a Return-to-LIBC attack detection application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, memory 114 includes a page based virtual memory system that uses pages, e.g., memory areas.

For example, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space. In one embodiment, when processor 108 is running in virtual memory mode, all addresses are assumed to be virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space or ring 3, available for use by a program; and, a high 2 GB system address space, also referred to as kernel address space or ring 0, reserved for use by the operating system.

To protect the integrity of the operating system code and other kernel address space code and data structures from errant or malicious programs and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls, sometimes called operating system (OS) function calls or APIs, that interface between the user mode and kernel mode functions.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, Return-to-LIBC attack detection application 106 is loaded into host computer system 102 via I/O device 123, such as from a CD, DVD or floppy disk containing Return-to-LIBC attack detection application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention.

Network 124 can be any network or network system that is of interest to a user. In various embodiments, network interface 138 and I/O interface 110 include analog modems, digital modems, or a network interface card.

Return-to-LIBC attack detection application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of Return-to-LIBC attack detection application 106 by processor 108 results in the operations of host computer process 200 as described below in one embodiment.

From an ENTER OPERATION 202, flow moves to a RECORD BRANCH TRACE RECORDS OPERATION 204. In RECORD BRANCH TRACE RECORDS OPERATION 204, recording of branch trace records is enabled and branch trace records are recorded.

As is well-known to those of skill in the art, a branch event occurs when control branches from one code block to another code block. For example, control branches from one code block to another code block via execution of a call, jump, interrupt, or return (ret) instruction and thus execution of a call, jump, interrupt, or return (ret) is a branch event.

A branch trace record consists of a branch-from field and a branch-to field containing a branch-from and a branch-to instruction address, respectively, for the branch event. Thus, for each branch event, a branch trace record is generated. More particularly, for each branch event, a branch trace records is generated including the branch-to instruction address of the instruction to which control is branching and the branch-from instruction address of the instruction from which control is branching.

From RECORD BRANCH TRACE RECORDS OPERATION 204, flow moves to a HOOK CRITICAL OPERATING SYSTEM (OS) FUNCTION(S) OPERATION 206. In HOOK CRITICAL OS FUNCTION(S) OPERATION 206, the critical operating system functions, e.g., at least one critical operating system function, of host computer system 102 are hooked. In one embodiment, a system level, e.g., a kernel mode module or kernel mode driver, hooks the critical operating system functions. Further, in one embodiment, an operating system function is hooked by redirecting calls to the operating system function, for example, to a hook module in accordance with the present invention.

For example, an operating system function is hooked by replacing the original system call in the system call table. By hooking in this manner, the call module is a user-mode process because Kernel-mode code will call the operating system function directly. If only certain processes are desired to be selectively protected, the process context is checked, e.g., process running as SYSTEM only, and the critical operating system function is called if the process is not one that is being monitored.

In one embodiment, an operating system function is critical if it is necessary for a first application, e.g., a parent application, to cause execution of a second application, e.g., a child application. In one particular embodiment, an operating system function is critical if it is necessary or likely to be used by a malicious parent application, e.g., an application which contains or uses malicious code, e.g., located on the stack, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

In one embodiment, on a Windows® operating system, the Createfile(), open, lcreat(), CreateProcess() and system() are critical OS functions. In yet another embodiment, critical OS functions are located in the C-library hence the name "Return-to-LIBC" attack.

As is well known to those of skill in the art, system calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use system calls, which form the only permitted interface between user-mode and kernel mode. In accordance with one embodiment, system calls include critical OS function calls and non-critical OS function calls.

From HOOK CRITICAL OS FUNCTION(S) OPERATION 206, flow moves to a CALL TO CRITICAL OS FUNCTION OPERATION 208. In CALL TO CRITICAL OS FUNCTION OPERATION 208, a call, sometimes called a critical OS function call, to a critical OS function is made by a call module of a parent application. The parent application may be malicious or non-malicious. More particularly, a critical OS function call is made by a call module of a parent application to an OS function that was hooked in HOOK CRITICAL OS FUNCTION(S) OPERATION 206.

In accordance with one embodiment of the present invention, a call module includes the critical OS function call instruction(s), i.e., the instruction or set of instructions that originates the critical OS function call. The call module may be malicious or non-malicious. The parent application includes the call module, or, in one embodiment, the parent application is the call module.

For example, system calls are originated by execution of a CALL instruction or a RET instruction (in the case of a Return-to-LIBC attack). In one embodiment, a CALL instruction is used to divert execution to a particular function. A RET instruction, sometimes called a return instruction, is used to return from a subroutine or marks the end of a main function.

From CALL TO CRITICAL OS FUNCTION OPERATION 208, flow moves to a STALL CALL OPERATION 210. In STALL CALL OPERATION 210, the critical OS function call of OPERATION 208 to the critical OS function is stalled, i.e., is prevented from reaching the operating system. By stalling the critical OS function call, execution of the critical OS function is stalled.

From STALL CALL OPERATION 210, flow moves to a SUSPEND BRANCH TRACE RECORDS RECORDING OPERATION 212. In SUSPEND BRANCH TRACE RECORDS RECORDING OPERATION 212, recording of branch trace records is suspended. In one embodiment, recording of branch trace records is suspended by disabling recording of branch trace of records. As discussed further below, the branch trace records are used to determine if the critical OS function call originated from a RET instruction. Thus, by suspending recording of the branch trace records in SUSPEND BRANCH TRACE RECORDS RECORDING OPERATION 212, the branch trace records of the critical OS function call are preserved.

From SUSPEND BRANCH TRACE RECORDS RECORDING OPERATION 212, flow moves to a BRANCH TRACE RECORDS OF THE CRITICAL OS FUNCTION CALL INCLUDE A RET INSTRUCTION CHECK OPERATION 214. In CHECK OPERATION 214, a determination is made as to whether the critical OS function call originated from execution of a RET instruction by determining whether the branch trace records of the critical OS function call, i.e., the branch trace records generated as a result of the critical OS function call, include a RET instruction. If a determination is made in CHECK OPERATION 214 that the critical OS function call did not originate from execution of a RET instruction, flow moves to an ALLOW CALL TO PROCEED OPERATION 216.

In ALLOW CALL TO PROCEED OPERATION 216, the critical OS function call is allowed to proceed. More particularly, the critical OS function call is passed to the operating system. As discussed above, the critical OS function call was stalled in STALL CALL OPERATION 210. From ALLOW CALL TO PROCEED OPERATION 216, flow moves to an UNSUSPEND BRANCH TRACE RECORDS RECORDING OPERATION 218.

In UNSUSPEND BRANCH TRACE RECORDS RECORDING OPERATION 218, branch trace records recording is unsuspended, e.g., recording of branch trace records is re-enabled and branch trace records are again recorded. Recall that branch trace records recording was suspended in SUSPEND BRANCH TRACE RECORDS RECORDING OPERATION 212.

From UNSUSPEND BRANCH TRACE RECORDS RECORDING OPERATION 218, flow moves to and exits at an EXIT OPERATION 220 or waits for the next critical OS function call and returns to OPERATION 208.

In a typical Return-to-LIBC attack, a return address is replaced with a malicious return address pointing to a library function in a loaded library, e.g., the C-library, inside the process address space by exploiting a buffer overflow. Thus, when the malicious return address is used by the RET instruction of the call module, a critical OS function call is made.

To illustrate, assume the following sequence of instructions existed in the libc.so:
Push eax
Call ebx.

If a hacker controls these registers, the hacker can point the eax to "/bin/sh" and ebx to the address of systems in libc.so. The hacker overwrites the return address with the push eax; call ebx" address in libc.so, manipulates eax and ebx, and when the function with the buffer overflow returns, the hacker compromises host computer system 102.

Thus, because a determination is made that the critical OS function call did not originate from execution of a RET instruction in CHECK OPERATION 214, the likelihood that the call module is malicious code is minimal. In one embodiment, malicious code is defined as any computer program, module, set of modules, or code that enters a computer system without an authorized user's knowledge and/or without an authorized user's consent.

However, if a determination is made in CHECK OPERATION 214 that the branch trace records of the critical OS function call include a RET instruction and thus that the critical OS function call did originate from execution of a RET instruction, flow moves, optionally, to a KNOWN FALSE POSITIVE CHECK OPERATION 222 (or directly to a TAKE PROTECTIVE ACTION OPERATION 224 if KNOWN FALSE POSITIVE CHECK .OPERATION 222 is not performed).

In KNOWN FALSE POSITIVE CHECK OPERATION 222, a determination is made as to whether the critical OS function call is a known false positive. A known false positive critical OS function call is a critical OS function call that originates from execution of a RET instruction but is, in fact, safe, i.e., is not associated with malicious code. An example of a known false positive critical OS function call is the case when non malicious code pushes an OS function address on to the stack and then transfers control to the OS function via a RET instruction. Illustratively, a user-defined or downloadable exclusion and/or inclusion list is used to determine whether the critical OS function call is a known false positive.

If a determination is made in CHECK OPERATION 222 that the critical OS function call is a known false positive critical OS function call, flow moves to ALLOW CALL TO PROCEED OPERATION 216, which is performed as discussed above. Conversely, if a determination is made in CHECK OPERATION 222 that the critical OS function call is not a known false positive critical OS function call, flow moves to a TAKE PROTECTIVE ACTION OPERATION 224.

In TAKE PROTECTIVE ACTION OPERATION 224, protective action is taken to prevent the malicious code of or used by the call module from causing damage to or exploiting host computer system 102. For example, the critical OS function call is terminated. More particularly, the critical OS function call is not passed to the operating system but is terminated. As discussed above, the critical OS function call was stalled in STALL CALL OPERATION 210.

In one embodiment, because a determination is made in CHECK OPERATION 214 that the critical OS function call did originate from execution of a RET instruction, the likelihood that the call module is malicious code is significant. However, by terminating the critical OS function call, the critical OS function is prevented from being executed. By terminating the critical OS function call, the malicious code of the call module is prevented from exploiting and/or damaging host computer system 102. In one embodiment, by terminating the critical OS function call, the child application is prevented from being executed. By preventing execution of the child application, remote access is denied thus preventing unauthorized access by malicious hackers as well as by replicating malware, e.g., worms.

As another example of protective action, the parent application including the call module and/or a malicious thread running within the context of the parent application is terminated. Termination of applications is well known to those of skill in the art and so is not discussed further for clarity of discussion.

In one embodiment, the user of host computer system 102 is given a set of choices on the protective action to be taken in TAKE PROTECTIVE ACTION OPERATION 224 (or whether no protective action is to be taken).

Flow moves from TAKE PROTECTIVE ACTION OPERATION 224, optionally, to a NOTIFY HOST COMPUTER SYSTEM USER/ADMINISTRATOR OPERATION 226 (or directly to UNSUSPEND BRANCH TRACE RECORDS RECORDING OPERATION 218 if OPERATION 226 is not performed). In NOTIFY HOST COMPUTER SYSTEM USER/ADMINISTRATOR OPERATION 226, the user of host computer system 102 and/or the administrator are notified that protective action has been taken on host computer system 102, e.g., that a call, a parent application and/or a call module have been terminated. The user and/or administrator can be notified using any one of a number of techniques, e.g., by using a pop up window, by writing to a file and/or otherwise by logging the event. Further, a notification or a sample of the malicious code can be provided to a security center and/or the stack frames can be written to disk for later analysis.

From NOTIFY HOST COMPUTER SYSTEM USER/ADMINISTRATOR OPERATION 226, flow moves to UNSUSPEND BRANCH TRACE RECORDS RECORDING OPERATION 218, which is performed as discussed above.

Figure 3:
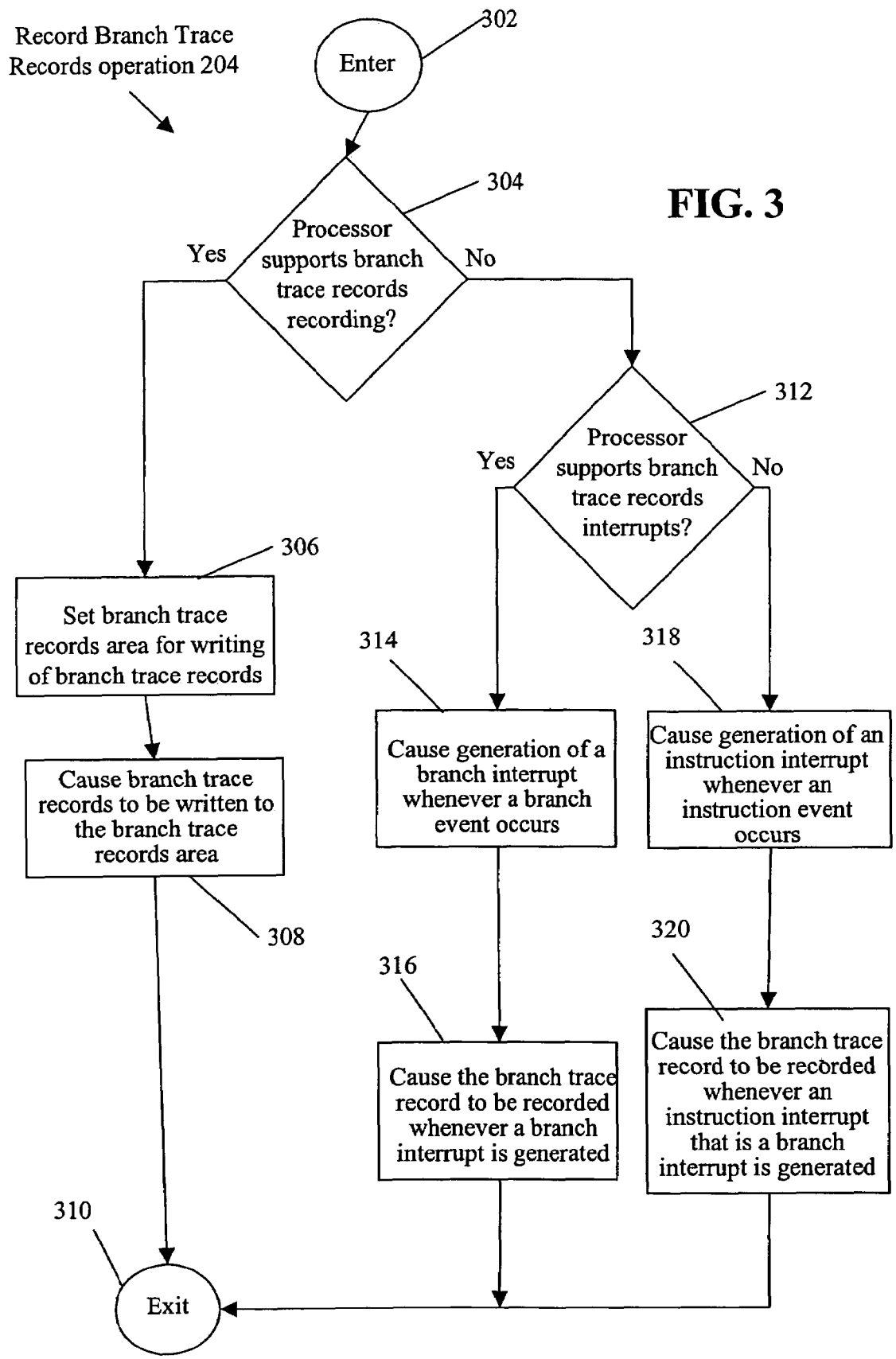
FIG. 3 is a flow diagram of a RECORD BRANCH TRACE RECORDS OPERATION in accordance with one embodiment of the present invention.

FIG. 3 is a flow diagram of RECORD BRANCH TRACE RECORDS OPERATION 204 in accordance with one embodiment of the present invention. Referring now to FIGS. 1 and 3, from an ENTER OPERATION 302, flow moves to a PROCESSOR SUPPORTS BRANCH TRACE RECORDS RECORDING CHECK OPERATION 304. In PROCESSOR SUPPORTS BRANCH TRACE RECORDS RECORDING CHECK OPERATION 304, a determination is made as to whether processor 108 of host computer system 102 supports branch trace records recording. For example, on x86 processors, a determination is made that the processor supports branch trace records recording if the debug store feature flag (bit 21) returned by the CPUID instruction is set and bit 11 of the IA32_MISC_ENABLE_MSR model-specific register (address 0×1a0) is clear.

If a determination is made that processor 108 of host computer system 102 does support branch trace records recording, flow moves from PROCESSOR SUPPORTS BRANCH TRACE RECORDS RECORDING CHECK OPERATION 304 to a SET BRANCH TRACE RECORDS AREA FOR WRITING OF BRANCH TRACE RECORDS OPERATION 306.

In SET BRANCH TRACE RECORDS AREA FOR WRITING OF BRANCH TRACE RECORDS OPERATION 306, processor 108 is instructed where to store the branch trace records. More particularly, a branch trace records area, sometimes called an area of memory 114, is set aside, sometimes called defined, for writing of branch trace records.

For example, when processor 108 is an Intel® Pentium 4 processor, a debug store address for writing of branch trace records is set in SET BRANCH TRACE RECORDS AREA FOR WRITING OF BRANCH TRACE RECORDS OPERATION 306. This is done by allocating space for the debug store, setting up the debug store management area to point to the new allocated space for the debug store, and setting the IA32_DS_AREA MSR (address 0×600) model-specific register to the base linear address of the debug store management area. Further DS save area mapped to contiguous linear address in non-pageable kernel space that is not on the same page as code is allocated.

From SET BRANCH TRACE RECORDS AREA FOR WRITING OF BRANCH TRACE RECORDS OPERATION 306, flow moves to a CAUSE BRANCH TRACE RECORDS TO BE WRITTEN TO THE BRANCH TRACE RECORDS AREA OPERATION 308. In CAUSE BRANCH TRACE RECORDS TO BE WRITTEN TO THE BRANCH TRACE RECORDS AREA OPERATION 308, branch trace records are caused to be written to the branch trace records area set in OPERATION 306.

To continue with the above example of when processor 108 is an Intel® Pentium 4 processor, writing of branch trace records to the debug store address is enabled in CAUSE BRANCH TRACE RECORDS TO BE WRITTEN TO THE BRANCH TRACE RECORDS AREA OPERATION 308. For example, the TR (bit 2) and BTS (bit 3) of the IA_32_DEBUGCTL_MSR (address 0×1d9) model-spcific register is set.

From CAUSE BRANCH TRACE RECORDS TO BE WRITTEN TO THE BRANCH TRACE RECORDS AREA OPERATION 308, flow moves to and exits at an EXIT OPERATION 310 and returns to HOOK CRITICAL OS FUNCTION(S) OPERATION 206 of FIG. 2.

Conversely, returning again to PROCESSOR SUPPORTS BRANCH TRACE-RECORDS RECORDING CHECK OPERATION 304, if a determination is made that processor 108 of host computer system 102 does not support branch trace records recording, flow moves from PROCESSOR SUPPORTS BRANCH TRACE RECORDS -RECORDING CHECK OPERATION 304 to a PROCESSOR SUPPORTS BRANCH TRACE RECORDS INTERRUPTS CHECK OPERATION 312.

In PROCESSOR SUPPORTS BRANCH TRACE RECORDS INTERRUPTS CHECK OPERATION 312, a determination is made as to whether processor 108 of host computer system 102 supports branch trace records interrupts, i.e., whether processor 108 of host computer system 102 supports causing generation of a branch interrupt whenever a branch event occurs.

If a determination is made that processor 108 of host computer system 102 does support branch trace records interrupts, flow moves from PROCESSOR SUPPORTS BRANCH TRACE RECORDS INTERRUPTS CHECK OPERATION 312 to a CAUSE GENERATION OF A BRANCH INTERRUPT WHENEVER A BRANCH EVENT OCCURS OPERATION 314. In CAUSE GENERATION OF A BRANCH INTERRUPT WHENEVER A BRANCH EVENT OCCURS OPERATION 314, generation of a branch interrupt whenever a branch event occurs is caused. for example, on x86 processors, this can be done by setting the TF (bit 8) in the EFLAGS register and BTF (bit 1) flag in the IA32_DEBUGCTL_MSR model-specific register.

In one embodiment, a branch interrupt is an interrupt generated when a branch event occurs.

From CAUSE GENERATION. OF A BRANCH INTERRUPT WHENEVER A BRANCH EVENT OCCURS OPERATION 314, flow moves to a CAUSE THE BRANCH TRACE RECORD TO BE RECORDED WHENEVER A BRANCH INTERRUPT IS GENERATED OPERATION 316. In CAUSE THE BRANCH TRACE RECORD TO BE RECORDED WHENEVER A BRANCH INTERRUPT IS GENERATED OPERATION 316, whenever a branch interrupt is generated, the branch trace record-associated with the branch event which caused the branch interrupt is recorded, e.g., with an interrupt handler. From CAUSE THE BRANCH TRACE RECORD TO BE RECORDED WHENEVER A BRANCH INTERRUPT IS GENERATED OPERATION 316, flow moves to and exits at EXIT OPERATION 310 as discussed above.

Conversely, returning again to PROCESSOR SUPPORTS BRANCH TRACE RECORDS INTERRUPTS CHECK OPERATION 312, if a determination is made that processor 108 of host computer system 102 does not support branch trace records interrupts, flow moves from PROCESSOR SUPPORTS BRANCH TRACE RECORDS INTERRUPTS CHECK OPERATION 312 to a CAUSE GENERATION OF AN INSTRUCTION INTERRUPT WHENEVER AN INSTRUCTION EVENT OCCURS OPERATION 318. In CAUSE GENERATION OF AN INSTRUCTION INTERRUPT WHENEVER AN INSTRUCTION EVENT OCCURS OPERATION 318, generation of an instruction interrupt whenever an instruction event occurs is caused. In one embodiment, an instruction event occurs when an instruction is executed. Further, an instruction interrupt is an interrupt generated when an instruction event occurs.

From CAUSE GENERATION OF AN INSTRUCTION INTERRUPT WHENEVER AN INSTRUCTION EVENT OCCURS OPERATION 318, flow moves to a CAUSE THE BRANCH TRACE RECORD TO BE RECORDED WHENEVER AN INSTRUCTION INTERRUPT THAT IS A BRANCH INTERRUPT IS GENERATED OPERATION 320. In CAUSE THE BRANCH TRACE RECORD TO BE RECORDED WHENEVER AN INSTRUCTION INTERRUPT THAT IS A BRANCH INTERRUPT IS GENERATED OPERATION 320, whenever an instruction interrupt that is a: branch interrupt is generated, the branch trace record associated with the branch event which caused the branch interrupt is recorded.

More particularly, because an instruction interrupt is generated for each instruction execution, including execution of instructions that are not associated with a branch event, a determination is made in OPERATION 320 as to whether the instruction interrupt is generated as a result of a branch event. If the instruction interrupt is generated as a result of a branch event, the instruction interrupt is a branch interrupt and the branch trace record associated with the branch event which generated the instruction interrupt is recorded.

From CAUSE THE BRANCH TRACE RECORD TO BE RECORDED WHENEVER AN INSTRUCTION INTERRUPT THAT IS A BRANCH INTERRUPT IS GENERATED OPERATION 320, flow moves to and exits at EXIT OPERATION 310 as discussed above.

Although specific operations for RECORD BRANCH TRACE RECORDS OPERATION 204 are set forth in FIG. 3, branch trace records and recording of branch trace records are well known to those of skill in the art and other techniques for recording of branch trace records can be used and the particular technique used is not essential to the present invention. See, for example, IA-32 Intel® Architecture Software Developer's Manual, Volume 3: System Programming Guide, 2002, pages 15-11 to 15-22, which is herein incorporated by reference in its entirety, for further information regarding recording of branch trace records.

Figure 4:
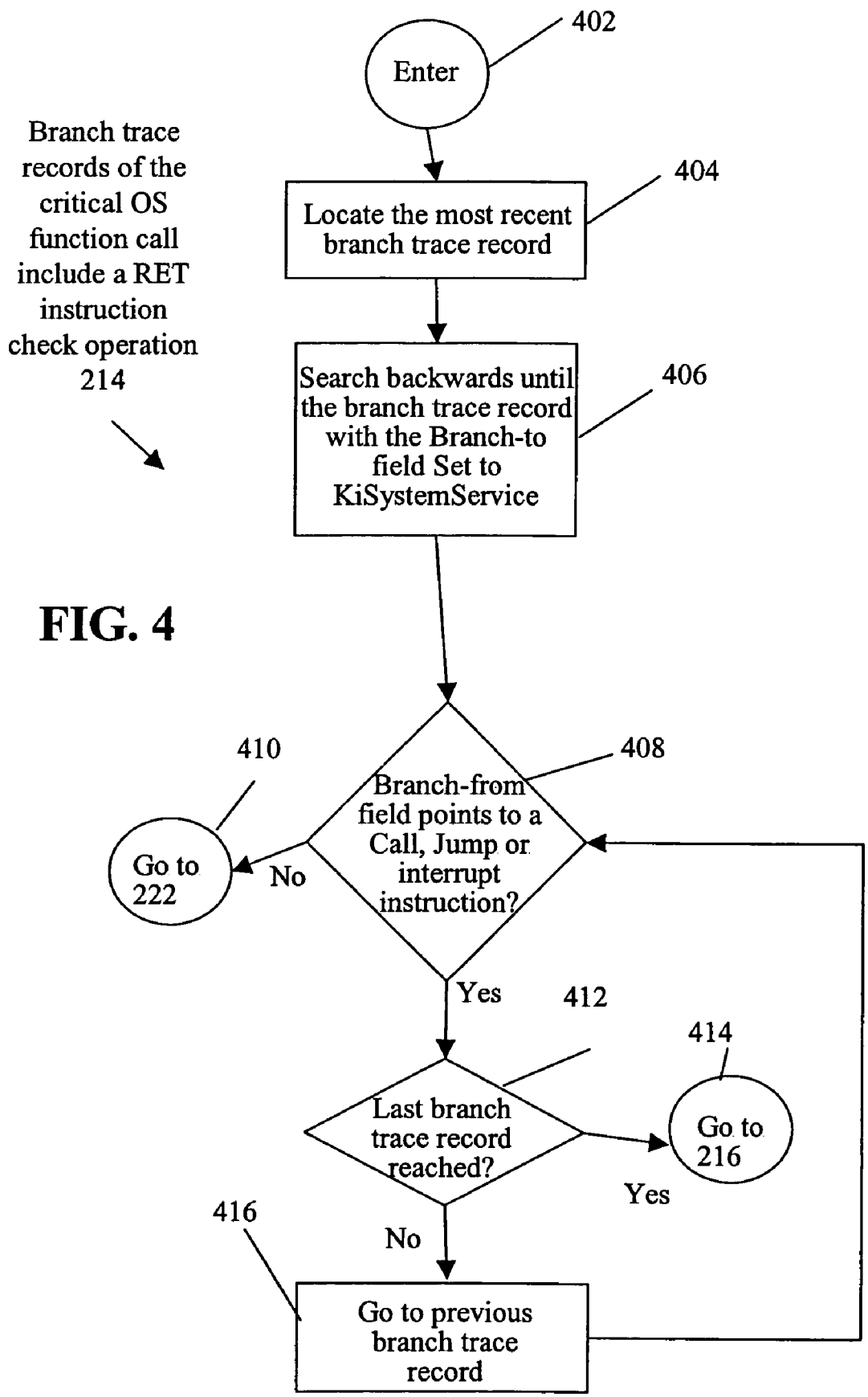
FIG. 4 is a flow diagram of a BRANCH TRACE RECORDS OF THE CRITICAL OS FUNCTION CALL INCLUDE A RET INSTRUCTION CHECK OPERATION in accordance with one embodiment of the present invention.

FIG. 4 is a flow diagram of BRANCH TRACE RECORDS OF THE CRITICAL OS FUNCTION CALL INCLUDE A RET INSTRUCTION CHECK OPERATION 214 in accordance with one embodiment of the present invention. Referring now to FIG. 4, from an ENTER OPERATION 402 (and from OPERATION 212 of FIG. 2), flow moves to a LOCATE THE MOST RECENT BRANCH TRACE RECORD OPERATION 404. In LOCATE THE MOST RECENT BRANCH TRACE RECORD OPERATION 404, the most recent branch trace record is located.

As is well-known to those of skill in the art, a user mode call to an operating system function, which is one example of an operating system function call, generates a plurality of branch trace records, and all of these branch trace records are associated with the user mode operating system function call.

For example, a user mode call to an operating system function, e.g., a critical OS function call, is not allowed direct access to the operating system function for security reasons. Access is provided in the form of a wrapper function or functions. More particularly, the user mode call calls the wrapper function. The wrapper function uses the INT 2E instruction, i.e., an interrupt, to switch to the kernel mode and execute the requested operating system function, sometimes called system service. Each operating system function in the kernel is identified by a service ID.

In one particular embodiment, the wrapper function fills in the service ID of the requested operating system function in the EAX register, fills in the pointer to the stack frame of the parameters in the EDX register, and issues the INT 2E instruction. The INT 2E instruction changes the processor to the kernel mode, and the processor starts executing the handler specified for the INT 2E instruction in the interrupt descriptor table (IDT). The INT 2E handler copies the parameters from user-mode stack to kernel-mode stack. The base of the stack frame is identified by the contents of the EDX register. The INT 2E handler is internally called as the KiSystemService() function.

Thus, in the above example, a branch trace record is generated as the user mode call calls the wrapper function. Another branch trace record is generated as the wrapper function calls the INT 2E instruction. Note that several branch trace records are sometimes generated, for example, a plurality of calls to a plurality of functions are sometimes required for the functionality of the user mode call calling the wrapper function and/or the wrapper function calling the INT 2E instruction.

In one embodiment, the branch trace records are stored in a circular buffer. A most recent record pointer, e.g., the BTS index in the debug store management area, points to the most recent branch trace record in the circular buffer.

From LOCATE THE MOST RECENT BRANCH TRACE RECORD OPERATION 404, flow moves to a SEARCH BACKWARDS UNTIL THE BRANCH TRACE RECORD WITH THE BRANCH-TO FIELD SET TO KISYSTEMSERVICE OPERATION 406. The branch trace record with the branch-to field set to KiSystemService() function is sometimes called the user to kernel branch trace record.

In SEARCH BACKWARDS UNTIL THE BRANCH TRACE RECORD WITH THE BRANCH-TO FIELD SET TO KISYSTEMSERVICE OPERATION 406, starting with the most recent branch trace record, each previous (earlier) branch trace record is searched until the branch trace record with the branch-to field set to KiSystemService() function is located. Generally, the KiSystemService() function is the first entry into the kernel during the critical OS function call. In one embodiment, critical OS function(s) are hooked in HOOK CRITICAL OS FUNCTION(S) OPERATION 206 by hooking the KiSystemService() function.

From SEARCH BACKWARDS UNTIL THE BRANCH TRACE RECORD WITH THE BRANCH-TO FIELD SET TO KISYSTEMSERVICE OPERATION 406, flow moves to a BRANCH-FROM FIELD POINTS TO A CALL, JUMP OR INTERRUPT INSTRUCTION CHECK OPERATION 408. In BRANCH-FROM FIELD POINTS TO A CALL, JUMP OR INTERRUPT INSTRUCTION CHECK OPERATION 408, a determination is made as to whether the previous instruction is a call, jump, or interrupt instruction, or, stated another way, whether the previous instruction is a RET instruction and thus not a call, jump, or interrupt instruction. More particularly, a determination is made as to whether the branch-from field of the branch trace record points to a call, jump, or interrupt instruction. Stated another way, a determination is made as to whether the address in the branch-from field of the branch trace record is an address of a call, jump, or interrupt instruction.

If the previous instruction is not a call, jump, or interrupt instruction, flow moves through an OPERATION 410 and to KNOWN FALSE POSITIVE CHECK OPERATION 222, which is performed as discussed above. In one embodiment, the address of the previous instruction is located in the branch-from field of the branch trace record with the branch-to field set to KiSystemService() function. Recall that this branch trace record with the branch-to field set to KiSystemService() function was located in OPERATION 406 discussed above.

For example, if the previous instruction is a RET instruction, and thus not a call, jump, or interrupt instruction, flow moves through OPERATION 410 and to KNOWN FALSE POSITIVE CHECK OPERATION 222. Upon a negative determination in KNOWN FALSE POSITIVE CHECK OPERATION 222, protective action is taken in TAKE PROTECTIVE ACTION OPERATION 224.

In one embodiment, because a determination is made in CHECK OPERATION 408 that the critical OS function call branched from a RET instruction, i.e., that at least one of the branch trace records for the critical OS function call contains a RET instruction, the likelihood that the call module is malicious code is significant. However, by taking protective action, the critical OS function is prevented from being executed. By preventing execution of the critical OS function, remote access is denied, thus preventing unauthorized access by malicious hackers and also by replicating malware, e.g., worms.

Conversely, if the previous instruction is a call, jump, or interrupt instruction, flow moves from CHECK OPERATION 408 to a LAST BRANCH TRACE RECORD REACHED CHECK OPERATION 412. For example, if the previous instruction is other than a RET instruction, i.e., a call, jump, or interrupt instruction, flow moves from CHECK OPERATION 408 to LAST BRANCH TRACE RECORD REACHED CHECK OPERATION 412.

In LAST BRANCH TRACE RECORD REACHED CHECK OPERATION 412, a determination is made as to whether the previous branch trace record is the most recent branch trace record, i.e., whether the last branch trace record has been reached. Recall that this most recent branch trace record was located in OPERATION 404 discussed above.

More particularly, in one embodiment, the branch trace records are stored in a circular buffer. A most recent record pointer points to the most recent branch trace record in the circular buffer. Thus, in LAST BRANCH TRACE RECORD REACHED CHECK OPERATION 412, a determination is made as to whether an entire loop has been made in the circular buffer.

If a determination is made that the last branch trace record has been reached, flow moves from CHECK OPERATION 412 to ALLOW CALL TO PROCEED OPERATION 216 through an OPERATION 414. In this event, the critical OS function call is not branching from a RET instruction, i.e., the branch trace records for the critical OS function call do not contain a RET instruction, and the likelihood that the call module is malicious code is minimal. Accordingly, the critical operating system function call is allowed to proceed in ALLOW CALL TO PROCEED OPERATION 216 as discussed above.

Conversely, if a determination is made that the last branch trace record has not been reached, flow moves from LAST BRANCH TRACE RECORD REACHED CHECK OPERATION 412 to a GO TO PREVIOUS BRANCH TRACE RECORD OPERATION 416.

In GO TO PREVIOUS BRANCH TRACE RECORD OPERATION 416, the previous branch trace record is selected. In one embodiment, the previous branch trace record is the branch trace record immediately before the current branch trace record.

CHECK OPERATION 408, CHECK OPERATION 412, and OPERATION 416 are repeated until either a determination is made in CHECK OPERATION 408 that the previous instruction is not a call, jump, or interrupt instruction or a determination is made in CHECK OPERATION 412 that the last branch trace record has been reached.

Figure 5:
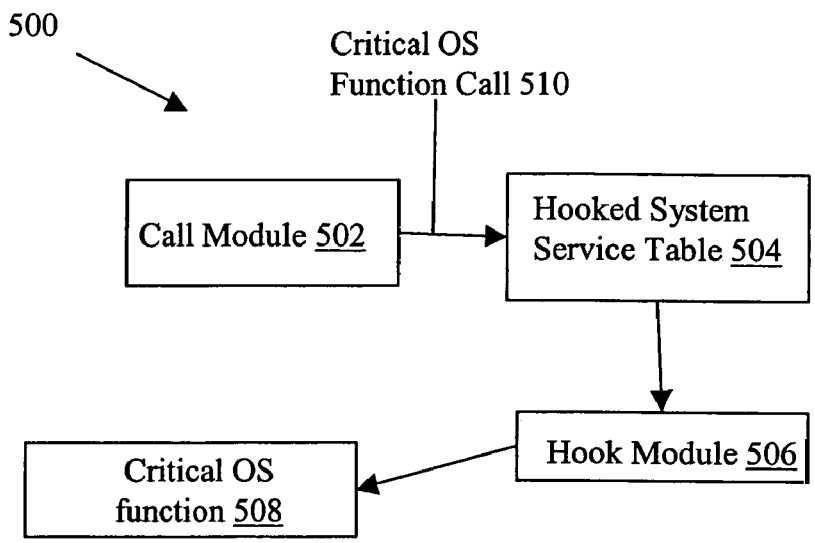
FIG. 5 is a diagram of a hooked operating system function call flow in accordance with one embodiment of the present invention.

FIG. 5 is a diagram of a hooked operating system function call flow 500 in accordance with one embodiment of the present invention. Referring now to FIGS. 2 and 5 together, a hook module 506 is used to hook calls to a critical OS function 508. In one embodiment, HOOK CRITICAL OS FUNCTION(S) OPERATION 206 is implemented using hook module 506, which is part of Return-to-LIBC attack detection application 106 (FIG. 1).

More particularly, a hooked system service table 504 routes noncritical OS function calls directly to the operating system (not shown). However, hooked system service table 504 routes critical OS function calls to hook module 506, e.g., a kernel mode module or kernel mode driver.

As is well known to those of skill in the art, a system service table, sometimes called a dispatch table or a system call table, relates system calls to specific addresses within the operating system kernel. Hooked system service table 504 in accordance with one embodiment of the present invention, redirects critical OS function calls to hook module 506 and from the specific addresses within the operating system kernel to which the critical OS function calls would otherwise be directed.

Although FIG. 5 describes one example of a hooked operating system function call path, in light of this disclosure, those of skill in the art will understand that other techniques can be used to hook operating system function(s). The particular technique used depends, for example, on the particular operating system.

In one embodiment, hook module 506 is used to stall a critical OS function call during STALL CALL OPERATION 210 of FIG. 2. Further, hook module 506 continues to stall the critical OS function call during SUSPEND BRANCH TRACE RECORDS RECORDING OPERATION 212, BRANCH TRACE RECORDS OF THE CRITICAL OS FUNCTION CALL INCLUDE A RET INSTRUCTION CHECK OPERATION 214 (and KNOWN FALSE POSITIVE CHECK OPERATION 222 if performed). Hook module 506 allows the critical OS function call to proceed to the operating system and thus to critical OS function 508 during ALLOW CALL TO PROCEED OPERATION 216. Conversely, hook module 506 terminates the critical OS function call and/or takes other protective action during TAKE PROTECTIVE ACTION OPERATION 224.

In accordance with this embodiment, a critical OS function call 510 originates from a call module 502 during CALL TO CRITICAL OS FUNCTION OPERATION 208. Critical OS function call 510 is routed by hooked system service table 504 to hook module 506. Critical OS function call 510 is stalled by hook module 506 in STALL CALL OPERATION 210. Hook module 506 suspends branch trace records recording in SUSPEND BRANCH TRACE RECORDS RECORDING OPERATION 212.

Figure 6:
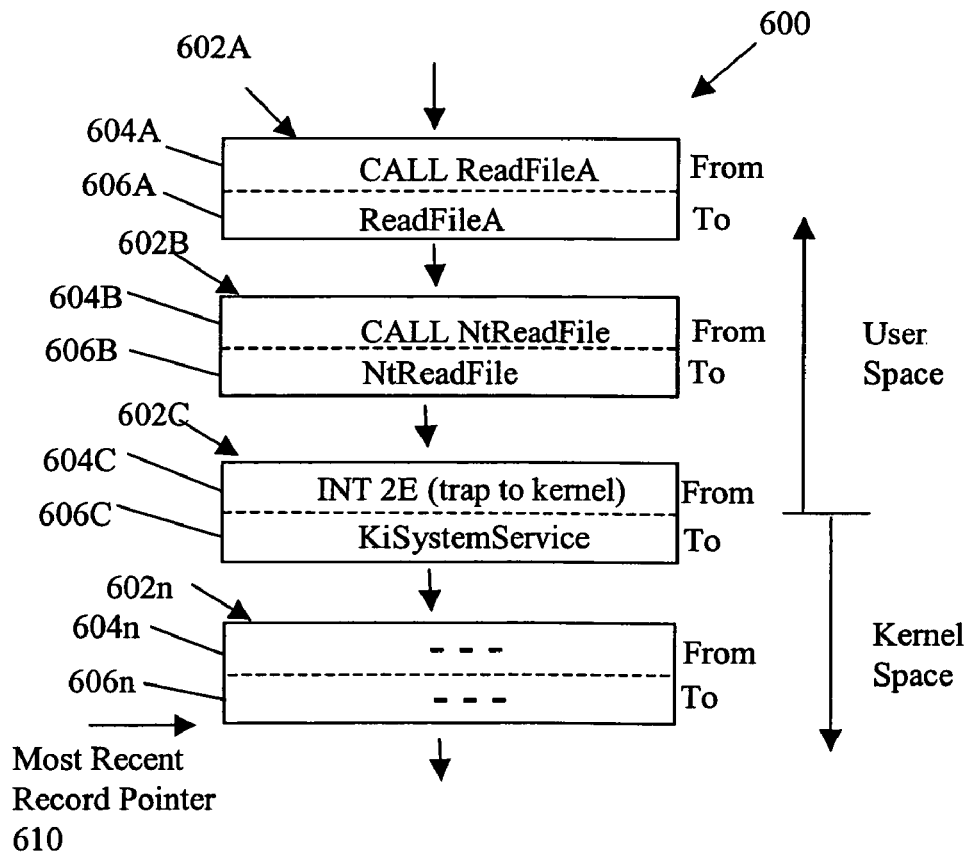
FIG. 6 is a pseudocode representation of a branch trace records area at the instant branch trace records recording is suspended in accordance with one embodiment of the present invention.

FIG. 6 is a pseudocode representation of a branch trace records area 600 at the instant when branch trace records recording is suspended in accordance with one embodiment of the present invention. In one embodiment, branch trace records area 600 is part of memory 114 (FIG. 1).

Referring now to FIG. 6, branch trace records area 600 includes a plurality of branch trace records 602A, 602B, 602C, ..., 602n, collectively called branch trace records 602. Branch trace records area 600 is a circular buffer such that reading each previous branch trace record will eventually return back to the first branch trace record read.

Each branch trace record 602. includes a branch-from field 604 and branch-to field 606. More particularly, branch trace records 602A, 602B, 602C, ..., 602n include branch-from fields 604A, 604B, 604C, ..., 604n and branch-to fields 606A, 606B, 606C, ..., 606n, respectively. Further, a most recent record pointer 610 points to the most recent of branch trace record 602.

Referring now to FIGS. 5 and 6 together, to originate critical OS function call 510, call module 502 calls a ReadFileA function, e.g., a wrapping function. More particularly, critical OS function call 510 is a user mode call, i.e., a branch event in the user space, and results in writing of branch trace record 602A in branch trace records area 600.

Branch trace record 602A includes the address of call module 502 (the address of the Call ReadFileA function) and the address of the ReadFileA function in branch-from field 604A and branch-to field 606A, respectively, of branch trace record 602A. Generally, when a branch trace record contains an address of an instruction or function in either the branch-to field or the branch-from field, the branch trace record is said to include the instruction or function.

The ReadFileA function calls, in turn, a NtReadFile function which generates a trap to kernel, e.g., an INT 2E instruction, sometimes called an interrupt. More particularly, the calling of the NtReadFile function by the ReadFileA function is a user mode call, i.e., a branch event in the user space, and results in writing of branch trace record 602B in branch trace records area 600.

Branch trace record 602B includes the address of the call NtReadFile function and the address of the NtReadFile function in branch-from field 604B and branch-to field 606B, respectively, of branch trace record 602B.

The NtReadFile function calls, in turn, the KiSystemService() function. More particularly, the calling of the KiSystemService() function by the NtReadFile function is a branch event from the user space to the kernel space, and results in writing of branch trace record 602C in branch trace records area 600.

Branch trace record 602C includes the address of the INT 2E function and the address of the KiSystemService() function in branch-from field 604C and branch-to field 606C, respectively, of branch trace record 602C.

One or more additional branch trace record 602 are generated subsequent to branch trace record 602C, e.g., by execution of instructions of hook module 506 or otherwise, until branch trace records recording is suspended in SUSPEND BRANCH TRACE RECORDS RECORDING OPERATION 212. The most recent branch trace record is identified by most recent record pointer 610.

Referring now to FIGS. 4, 5, and 6 together, in LOCATE THE MOST RECENT BRANCH TRACE RECORD OPERATION 404, most recent record pointer 610 is used to identify the most recent branch trace record, which is branch trace record 602n in this example.

In SEARCH BACKWARDS UNTIL THE BRANCH TRACE RECORD WITH THE BRANCH-TO FIELD SET TO KISYSTEMSERVICE OPERATION 406, branch trace records 602 are searched backwards (to earlier branch trace records) until branch trace record 602C is located. As discussed above, branch trace record 602C has branch-to field 606C set to the KiSystemService() function.

In BRANCH-FROM FIELD POINTS TO A CALL, JUMP OR INTERRUPT INSTRUCTION CHECK OPERATION 408, branch-from field 604C of branch trace record 602C is checked to see if the address points to a call, jump, or interrupt instruction. As discussed above, branch-from field 604C of branch trace record 602C includes the address of the INT 2E function, which is an interrupt instruction. Accordingly, flow moves to LAST BRANCH TRACE RECORD REACHED CHECK OPERATION 412.

In LAST BRANCH TRACE RECORD REACHED CHECK OPERATION 412, a determination is made as to whether the previous branch trace record is the most recent branch trace record. In this example, the previous branch trace record is branch trace record 602B, which is not the most recent branch trace record (branch trace record 602n). Accordingly, in GO TO PREVIOUS BRANCH TRACE RECORD OPERATION 416, branch trace record 602B is selected.

Returning again to BRANCH-FROM FIELD POINTS TO A CALL, JUMP OR INTERRUPT INSTRUCTION CHECK OPERATION 408, branch-from field 604B of branch trace record 602B is checked to see if the address points to a call, jump, or interrupt instruction. As discussed above, branch-from field 604B of branch trace record 602B includes the address of the call NtReadFile function, which is a call instruction. Accordingly, flow moves to LAST BRANCH TRACE RECORD REACHED CHECK OPERATION 412.

In this example, the previous branch trace record is branch trace record 602A, which is not the most recent branch trace record (branch trace record 602n). Accordingly, in GO TO PREVIOUS BRANCH TRACE RECORD OPERATION 416, branch trace record 602A is selected.

Returning again to BRANCH-FROM FIELD POINTS TO A CALL, JUMP OR INTERRUPT INSTRUCTION CHECK OPERATION 408, branch-from field 604A of branch trace record 602A is checked to see if the address points to a call, jump, or interrupt instruction. As discussed above, branch-from field 604A of branch trace record 602A includes the address of the Call ReadFileA function, which is a call instruction. Accordingly, flow moves to LAST BRANCH TRACE RECORD REACHED CHECK OPERATION 412.

In this example, the previous branch trace record is branch trace record 602n, which is the most recent branch trace record. Accordingly, flow moves to ALLOW CALL TO PROCEED OPERATION 216 through OPERATION 414.

Thus, in this embodiment where call module 502 is not malicious, critical OS function call 510 is not branching from a RET instruction, i.e., the branch trace records 602 for critical OS function call 510 do not contain a RET instruction, and it is highly unlikely that call module 502 is malicious code. Accordingly, critical OS function call 510 is allowed to proceed in ALLOW CALL TO PROCEED OPERATION 216 as discussed above.

Figure 7:
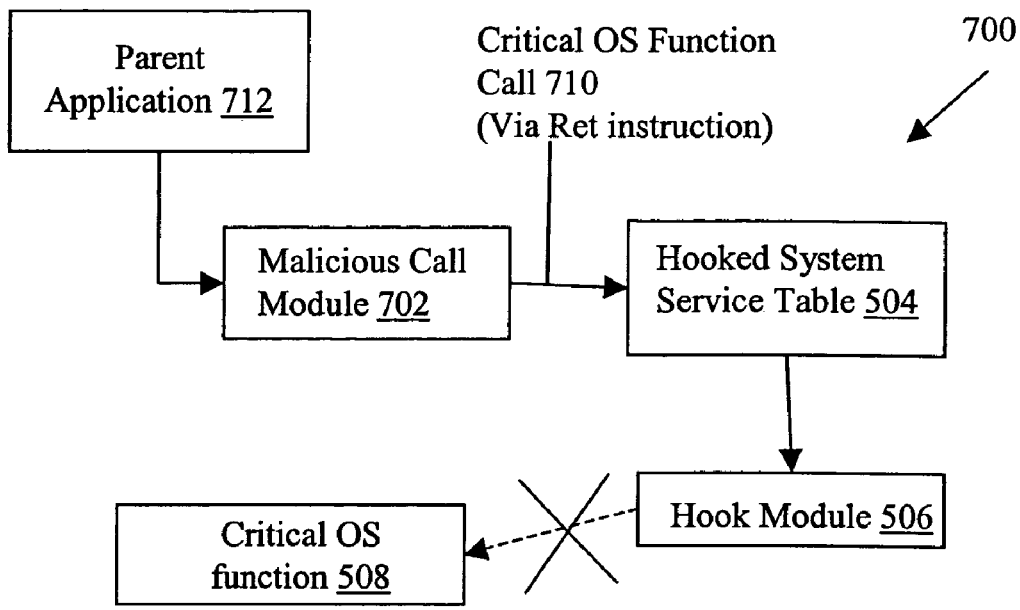
FIG. 7 is a diagram of a hooked operating system function call flow in accordance with another embodiment of the present invention.

FIG. 7 is a diagram of a hooked operating system function call flow 700 in accordance with another embodiment of the present invention. Referring now to FIGS. 2 and 7, hook module 506 is used to hook calls to critical OS function 508 routed from hooked system service table 504 as discussed above in reference to FIG. 5, the discussion of which is herein incorporated by reference.

In accordance with this embodiment, a critical OS function call 710 originates from a malicious call module 702 during CALL TO CRITICAL OS FUNCTION OPERATION 208. For example, control is transferred from a parent application 712 to malicious call module 702. As discussed further below, instead of returning control to parent application 712, malicious call module 702 originates critical OS function call 710 by executing a RET instruction using a malicious return address placed on to a stack as a result of a buffer overflow in a typical Return-to-LIBC attack.

Critical OS function call 710 is routed by hooked system service table 504 to hook module 506. Critical OS function call 710 is stalled by hook module 506 in STALL CALL OPERATION 210. Hook module 506 suspends recording of branch trace records in SUSPEND BRANCH TRACE RECORDS RECORDING OPERATION 212.

Figure 8:
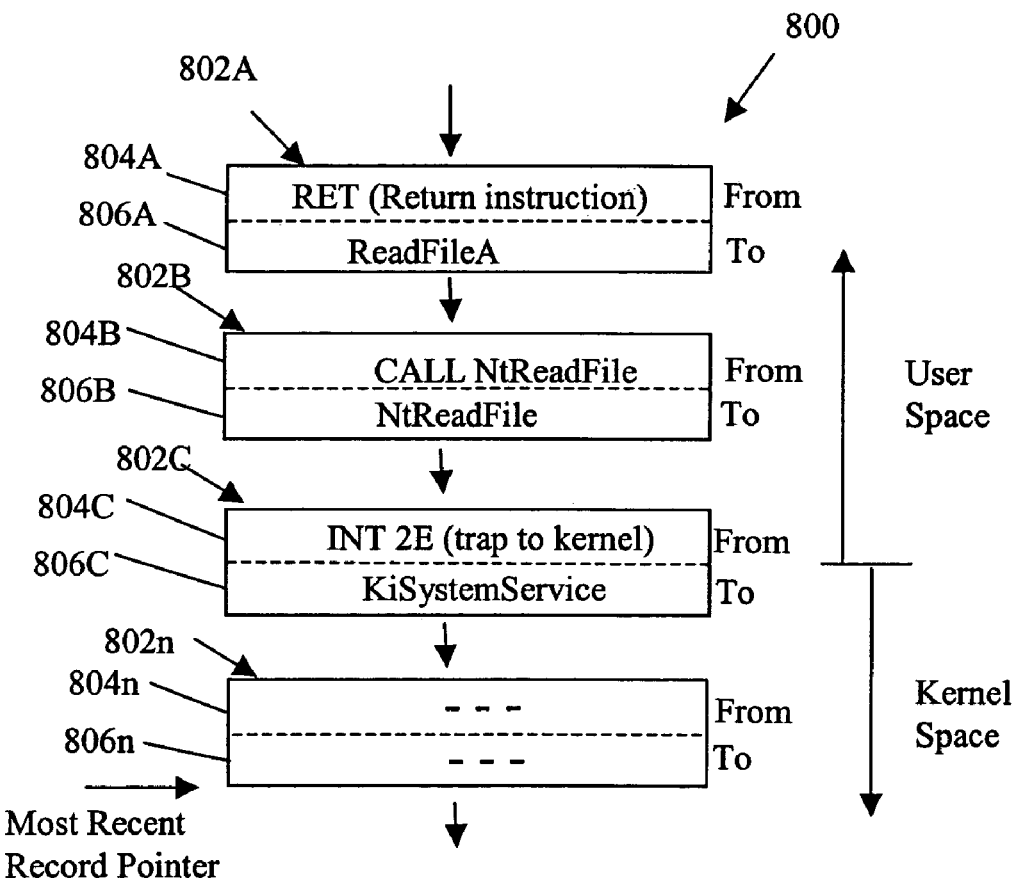
FIG. 8 is a pseudocode representation of a branch trace records area at the instant when branch trace records recording is suspended in accordance with one embodiment of the present invention.

FIG. 8 is a pseudocode representation of a branch trace records area 800 at the instant when recording of branch trace records is suspend in accordance with one embodiment of the present invention. In one embodiment, branch trace records area 800 is part of memory 114 (FIG. 1).

Referring now to FIG. 8, branch trace records area 800 includes a plurality of branch trace records 802A, 802B, 802C, . . . , 802n, sometimes called branch trace records 802. Branch trace records area 800 is a circular buffer such that reading each previous branch trace record will eventually return back to the first branch trace record read.

Each branch trace record 802 includes a branch-from field 804 and branch-to field 806. More particularly, branch trace records 802A, 802B, 802C, . . . , 802n include branch-from fields 804A, 804B, 804C, . . . , 804n and branch-to fields 806A, 806B, 806C, . . . , 806n, respectively. Further, a most recent record pointer 810 points to the most recent of branch trace record 802.

Referring now to FIGS. 7 and 8 together, to originate critical OS function call 710, malicious call module 702 returns to a ReadFileA function via a RET instruction. More particularly, critical OS function call 710 is a user mode call via a RET instruction, i.e., a branch event in the user space, and results in writing of branch trace record 802A in branch trace records area 800. Branch trace record 802A includes the address of malicious call module 702 (the address of the RET ReadFileA function) and the address of the ReadFileA function in branch-from field 804A and branch-to field 806A, respectively, of branch trace record 802A.

The ReadFileA function calls, in turn, a NtReadFile function which generates a trap to kernel, e.g., an INT 2E instruction, sometimes called an interrupt. More particularly, the calling of the NtReadFile function by the ReadFileA function is a user mode call, i.e., a branch event in the user space, and results in writing of branch trace record 802B in branch trace records area 800.

Branch trace record 802B includes the address of the call NtReadFile function and the address of the NtReadFile function in branch-from field 804B and branch-to field 806B, respectively, of branch trace record 802B.

The NtReadFile function calls, in turn, the KiSystemService() function. More particularly, the calling of the KiSystemService() function by the NtReadFile function is a branch event from the user space to the kernel space, and results in writing of branch trace record 802C in branch trace records area 800.

Branch trace record 802C includes the address of the INT 2E function and the address of the KiSystemService() function in branch-from field 804C and branch-to field 806C, respectively, of branch trace record 802C.

One or more additional branch trace record 802 are generated subsequent to branch trace record 802C, e.g., by execution of instructions of hook module 506 or otherwise, until branch trace records recording is suspended in SUSPEND BRANCH TRACE RECORDS RECORDING OPERATION 212. The most recent branch trace record is identified by most recent record pointer 810.

Referring now to FIGS. 4, 7, and 8 together, in LOCATE THE MOST RECENT BRANCH TRACE RECORD OPERATION 404, most recent record pointer 810 is used to identify the most recent branch trace record, which is branch trace record 802n in this example.

In SEARCH BACKWARDS UNTIL THE BRANCH TRACE RECORD WITH THE BRANCH-TO FIELD SET TO KISYSTEMSERVICE OPERATION 406, branch trace records 802 are searched backwards (to earlier branch trace records) until branch trace record 802C is located. As discussed above, branch trace record 802C has branch-to field 806C set to the KiSystemService() function.

In BRANCH-FROM FIELD POINTS TO A CALL, JUMP OR INTERRUPT INSTRUCTION CHECK OPERATION 408, branch-from field 804C of branch trace record 802C is checked to see if the address points to a call, jump, or interrupt instruction. As discussed above, branch-from field 804C of branch trace record 802C includes the address of the INT 2E function, which is an interrupt instruction. Accordingly, flow moves to LAST BRANCH TRACE RECORD REACHED CHECK OPERATION 412.

In LAST BRANCH TRACE RECORD REACHED CHECK OPERATION 412, a determination is made that the previous branch trace record is branch trace record 802B, which is not the most recent branch trace record (branch trace record 802n). Accordingly, in GO TO PREVIOUS BRANCH TRACE RECORD OPERATION 416, branch trace record 802B is selected.

Returning again to BRANCH-FROM FIELD POINTS TO A CALL, JUMP OR INTERRUPT INSTRUCTION CHECK OPERATION 408, branch-from field 804B of branch trace record 802B is checked to see if the address points to a call, jump, or interrupt instruction. As discussed above, branch-from field 804B of branch trace record 602B includes the address of the call NtReadFile function, which is a call instruction. Accordingly, flow moves to LAST BRANCH TRACE RECORD REACHED CHECK OPERATION 412.

In this example, the previous branch trace record is branch trace record 802A, which is not the most recent branch trace record (branch trace record 802n). Accordingly, in GO TO PREVIOUS BRANCH TRACE RECORD OPERATION 416, branch trace record 802A is selected.

Returning again to BRANCH-FROM FIELD POINTS TO A CALL, JUMP OR INTERRUPT INSTRUCTION CHECK OPERATION 408, branch-from field 804A of branch trace record 802A is checked to see if the address points to a call, jump, or interrupt instruction. As discussed above, branch-from field 804A of branch trace record 802A includes the address of the RET instruction which returned to the ReadFileA function, which is a RET instruction, i.e., is not a call, jump or interrupt instruction. Accordingly, flow moves to KNOWN FALSE POSITIVE CHECK OPERATION 222 through OPERATION 410.

Accordingly, in this embodiment where malicious call module 702 is malicious, critical OS function call 710 is branching from a RET instruction, i.e., the branch trace records 802 for critical OS function call 710 do contain a RET instruction, and the likelihood that malicious call module 702 is malicious code is significant. Accordingly, upon a determination that critical OS function call 710 is not a known false positive in CHECK OPERATION 222, protective action is taken in TAKE PROTECTIVE ACTION OPERATION 224.

Illustratively, hook module 506 terminates critical OS function call 710. By terminating critical OS function call 710, execution of critical OS function 508 is prevented. This, in turn, denies remote access thus preventing unauthorized access to host computer system 102 by malicious hackers and also by replicating malware, e.g., worms.

Referring again to FIG. 1, Return-to-LIBC attack detection application 106 is in computer memory 114. As used herein, a computer memory refers to a volatile memory, a non-volatile memory, or a combination of the two.

Although Return-to-LIBC attack detection application 106 is referred to as an application, this is illustrative only. Return-to-LIBC attack detection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, Return-to-LIBC attack detection application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, Return-to-LIBC attack detection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the Return-to-LIBC attack detection functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the Return-to-LIBC attack detection functionality in accordance with one embodiment of the present invention can be implemented in a wide variety of computer system configurations. In addition, the Return-to-LIBC attack detection functionality could be stored as different modules in memories of different devices. For example, Return-to-LIBC attack detection application 106 could initially be stored in server system 130, and then as necessary, a portion of Return-to-LIBC attack detection application 106 could be transferred to host computer system 102 and executed on host computer system 102. Consequently, part of the Return-to-LIBC attack detection functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

Return-to-LIBC attack detection application 106 is stored in memory 136 of server system 130. Return-to-LIBC attack detection application 106 is transferred over network 124 to memory 114 in host computer system 102. In this embodiment, network interface 138 and I/O interface 110 would include analog modems, digital modems, or a network interface card. If modems are used, network 124 includes a communications network, and Return-to-LIBC attack detection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of-skill in the art in view of this disclosure.

What is claimed is:

1. A method comprising:
   stalling a call to a critical operating system (OS) function;
   determining whether branch trace records of said call include a return instruction comprising:
      locating a most recent branch trace record of said branch trace records;

searching said branch trace records from said most recent branch trace record to locate a user to kernel branch trace record of said branch trace records; and searching previous branch trace records previous to said user to kernel branch trace record for said return instruction; and taking protective action to protect a computer system upon a determination that said branch trace records include said return instruction.

2. The method of claim 1 wherein upon a determination that said previous branch trace records do not include said return instruction, said method further comprising allowing said call to proceed.

3. The method of claim 1 wherein upon a determination that at least one of said previous branch trace records does include said return instruction, said taking protective action to protect a computer system is performed.

4. The method of claim 1 wherein said taking protective action comprises terminating said call.

5. The method of claim 1 wherein said taking protective action comprises terminating a call module originating said call.

6. The method of claim 1 wherein said taking protective action comprises terminating a parent application comprising a call module originating said call.

7. The method of claim 1 further comprising providing a notification that said protective action has been taken.

8. The method of claim 1 further comprising allowing said call to proceed upon a determination that said branch trace records do not include said return instruction.

9. The method of claim 1 wherein upon a determination that said branch trace records include said return instruction, said method further comprising determining whether said call is a known false positive.

10. The method of claim 9 wherein upon a determination that said call is not said known false positive, said taking protective action to protect a computer system is performed.

11. The method of claim 10 further comprising providing a notification that said protective action has been taken.

12. The method of claim 9 wherein upon a determination that said call is said known false positive, said method further comprising allowing said call to proceed.

13. The method of claim 1 further comprising hooking said critical OS function.

14. The method of claim 1 further comprising recording said branch trace records.

15. The method of claim 14 further comprising suspending recording of said branch trace records prior to said determining whether branch trace records of said call include a return instruction.

16. The method of claim 15 further comprising unsuspending recording of said branch trace records after said determining whether branch trace records of said call include a return instruction.

17. The method of claim 1 wherein said critical OS function is necessary for a first application to cause execution of a second application.

18. The method of claim 17 wherein said second application allows remote access of a computer system.

19. A method comprising:

recording branch trace records;

stalling a call to a critical operating system (OS) function;

suspending recording of said branch trace records;

locating a most recent branch trace record of said branch trace records;

searching said branch trace records from said most recent branch trace record to locate a user to kernel branch trace record of said branch trace records; and determining whether previous branch trace records previous to said user to kernel branch trace record include only call, jump, or interrupt instructions, wherein upon a determination that at least one of said previous branch trace records includes a return instruction, said method further comprising taking protective action to protect a computer system.

20. The method of claim 19 wherein said determining whether previous branch trace records previous to said user to kernel branch trace record include only call, jump, or interrupt instructions is performed until a determination is made that a last branch trace record has been reached.

21. The method of claim 20 wherein upon a determination that said last branch trace record has been reached, said method further comprising allowing said call to proceed.

22. The method of claim 19 wherein said determining whether previous branch trace records previous to said user to kernel branch trace record include only call, jump, or interrupt instructions is performed until a determination is made that said at least one of said previous branch trace records includes said return instruction.

23. A computer program product comprising a tangible computer readable medium containing computer program code comprising:

a Return-to-LIBC attack detection application for recording branch trace records;

said Return-to-LIBC attack detection application further for stalling a call to a critical operating system (OS) function;

said Return-to-LIBC attack detection application further for suspending recording of said branch trace records;

said Return-to-LIBC attack detection application further for locating a most recent branch trace record of said branch trace records;

said Return-to-LIBC attack detection application further for searching said branch trace records from said most recent branch trace record to locate a user to kernel branch trace record of said branch trace records; and said Return-to-LIBC attack detection application further for determining whether previous branch trace records previous to said user to kernel branch trace record include only call, jump, or interrupt instructions, wherein upon a determination that at least one of said previous branch trace records includes a return instruction, said Return-to-LIBC attack detection application further for taking protective action to protect a computer system.

* * * * *